United States Patent
He et al.

(10) Patent No.: US 11,537,256 B2
(45) Date of Patent: Dec. 27, 2022

(54) TOUCH SUBSTRATE AND METHOD FOR MANUFACTURING THE SAME, AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Fan He, Beijing (CN); Xiangdan Dong, Beijing (CN); Jun Yan, Beijing (CN); Bo Cheng, Beijing (CN); Zhengwei Luo, Beijing (CN); Kemeng Tong, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/309,430

(22) PCT Filed: Aug. 4, 2020

(86) PCT No.: PCT/CN2020/106732
§ 371 (c)(1),
(2) Date: May 26, 2021

(87) PCT Pub. No.: WO2021/023175
PCT Pub. Date: Feb. 11, 2021

(65) Prior Publication Data
US 2022/0035472 A1    Feb. 3, 2022

(30) Foreign Application Priority Data
Aug. 6, 2019 (CN) .......................... 201910720575.3

(51) Int. Cl.
*G06F 3/047* (2006.01)
*G06F 3/044* (2006.01)

(52) U.S. Cl.
CPC ............ *G06F 3/047* (2013.01); *G06F 3/0445* (2019.05); *G06F 2203/04102* (2013.01); *G06F 2203/04111* (2013.01)

(58) Field of Classification Search
CPC ................ G06F 3/047; G06F 3/0445; G06F 2203/04102; G06F 2203/04111;
(Continued)

(56) References Cited

U.S. PATENT DOCUMENTS 10,120,516 B2   11/2018   Wang et al.
10,705,662 B2   7/2020    Zhang et al.
(Continued)

FOREIGN PATENT DOCUMENTS

CN    101634922 A  *  1/2010   ............. G06F 3/044
CN    101634922 A      1/2010
(Continued)

OTHER PUBLICATIONS

Machine translation of CN 101634922A (Year: 2010).*
First Office Action dated Nov. 18, 2020 from CNIPA for Chinese Application No. 201910720575.3.

*Primary Examiner* — Patrick N Edouard
*Assistant Examiner* — Joseph P Fox
(74) *Attorney, Agent, or Firm* — Kinney & Lange, P.A.

(57) ABSTRACT

A touch substrate and a method for manufacturing the same, and a display device are provided. The touch substrate includes: a base substrate; a plurality of first electrodes including body segments arranged in an electrode pattern layer; a plurality of second electrodes including body segments arranged in the electrode pattern layer, wherein the first electrodes and the second electrodes intersect at intersection areas on the touch substrate; and an insulating layer arranged on a side of the electrode pattern layer away from the base substrate and provided with first via holes and second via holes; wherein each first electrode includes a first conductive bridge, each second electrode includes a second conductive bridge, and in an intersection area, two adjacent body segments of a first electrode are electrically connected through the first conductive bridge, and/or two adjacent body segments of a second electrode are electrically connected through the second conductive bridge.

11 Claims, 14 Drawing Sheets

(58) Field of Classification Search
CPC .... G06F 3/0443; G06F 3/0446; G06F 3/0412; G06F 2203/04103
See application file for complete search history.

(56) References Cited

U.S. PATENT DOCUMENTS

| | | |
|---|---|---|
| 2010/0182272 A1 | 7/2010 | Kang et al. |
| 2013/0285939 A1* | 10/2013 | Kim ............... G06F 3/0443 345/173 |
| 2016/0370939 A1* | 12/2016 | Guo ............... G06F 3/0446 |
| 2017/0075463 A1 | 3/2017 | Wang et al. |
| 2019/0243486 A1 | 8/2019 | Zhang et al. |
| 2020/0034026 A1* | 1/2020 | Han ............... G06F 3/04845 |

FOREIGN PATENT DOCUMENTS

| | | |
|---|---|---|
| CN | 102622114 A | 8/2012 |
| CN | 102915147 A | 2/2013 |
| CN | 103309509 A | 9/2013 |
| CN | 104750343 A | 7/2015 |
| CN | 105117067 A | 12/2015 |
| CN | 106293216 A | 1/2017 |
| CN | 106293298 A | 1/2017 |
| CN | 109426389 A | 3/2019 |
| CN | 110413156 A | 11/2019 |
| KR | 20120038130 A | 4/2012 |

* cited by examiner

TOUCH SUBSTRATE AND METHOD FOR MANUFACTURING THE SAME, AND DISPLAY DEVICE

CROSS REFERENCE TO RELATED APPLICATION(S)

This application is a Section 371 National Stage Application of International Application No. PCT/CN2020/106732, filed on Aug. 4, 2020, entitled "TOUCH SUBSTRATE AND MANUFACTURING METHOD THEREOF, AND DISPLAY DEVICE", which in turn claims priority to Chinese Patent Application No. 201910720575.3, filed on Aug. 6, 2019, the contents of which are incorporated herein by reference in their entireties.

TECHNICAL FIELD

The present disclosure relates to a field of circuits, and in particular to a touch substrate, a method for manufacturing the touch substrate, and a display device.

BACKGROUND

In a touch panel, transmitting (Tx) electrodes and receiving (Rx) electrodes are arranged crosswise on the panel in mutually orthogonal directions to realize a detection of a touch position. In an electrode layout scheme proposed by Flexible Multiple Layer on Cell (FMLOC) technology, the Tx electrodes and the Rx electrodes are arranged in a same layer.

SUMMARY

According to a first aspect of the present disclosure, a touch substrate is provided, and the touch substrate includes: a base substrate; a plurality of first electrodes arranged on the base substrate, wherein each first electrode of the plurality of first electrodes extends in a first direction, and the each first electrode includes a plurality of body segments; a plurality of second electrodes arranged on the base substrate, wherein each second electrode of the plurality of second electrodes extends in a second direction intersecting the first direction, the each second electrode includes a plurality of body segments arranged in a same electrode pattern layer as the plurality of body segments of the each first electrode, and the plurality of first electrodes and the plurality of second electrodes intersect at a plurality of intersection areas on the touch substrate; an insulating layer arranged on a side of the electrode pattern layer away from the base substrate and provided with at least one pair of first via holes and at least one pair of second via holes, wherein a pair of first via holes of the at least one pair of first via holes exposes a pair of first bridging areas of the first electrode, and a pair of second via holes of the at least one pair of second via holes exposes a pair of second bridging areas of the second electrode; wherein the each first electrode of the plurality of first electrodes includes at least one first conductive bridge, a part of each first conductive bridge is arranged on a side of the insulating layer away from the base substrate, and an orthographic projection of the each first conductive bridge on the base substrate at least partially overlaps an orthographic projection of the pair of first via holes on the base substrate, and the each first conductive bridge is configured to electrically connect a pair of first bridging areas exposed by the pair of first via holes; and wherein the each second electrode of the plurality of second electrodes includes at least one second conductive bridge, a part of each second conductive bridge is arranged on a side of the insulating layer away from the base substrate, and an orthographic projection of the each second conductive bridge on the base substrate at least partially overlaps an orthographic projection of the pair of second via holes on the base substrate, and the each second conductive bridge is configured to electrically connect a pair of second bridging areas exposed by the pair of second via holes; and in at least one intersection area, two adjacent body segments of one of the first electrodes are electrically connected through the first conductive bridge, and/or two adjacent body segments of one of the second electrodes are electrically connected through the second conductive bridge.

In some embodiments, an orthographic projection of the plurality of body segments of the each first electrode on the base substrate at least partially overlaps an orthographic projection of at least one of the at least one first conductive bridge on the base substrate, and an orthographic projection of the plurality of body segments of the each second electrode on the base substrate at least partially overlaps an orthographic projection of at least one of the at least one second conductive bridge on the base substrate.

In some embodiments, the first conductive bridge is only arranged in at least one of the plurality of intersection areas, and the second conductive bridge is only arranged in at least one of the plurality of intersection areas.

In some embodiments, the plurality of intersection areas include a first intersection area in which the first conductive bridge is located and a second intersection area in which the second conductive bridge is located, and the first intersection area and the second intersection area are arranged alternately.

In some embodiments, at least one of the at least one first conductive bridge is arranged in a non-intersection area of the first electrode.

In some embodiments, at least one of the at least one second conductive bridge is arranged in a non-intersection area of the second electrode.

In some embodiments, the first conductive bridge and the second conductive bridge are provided in at least one intersection area.

In some embodiments, an orthographic projection of the first conductive bridge in an intersection area on the base substrate does not overlap an orthographic projection of the second conductive bridge in the intersection area on the base substrate.

In some embodiments, two adjacent body segments of the one of the first electrodes are electrically connected by a pair of first conductive bridges arranged in parallel; or two adjacent body segments of the one of the second electrodes are electrically connected by a pair of second conductive bridges arranged in parallel.

In some embodiments, the each first electrode further includes an intersection segment connected between body segments of the each first electrode; or the each second electrode further includes an intersection segment connected between body segments of the each second electrode.

According to a second aspect of the present disclosure, a display device including the touch substrate described above is provided.

According to a third aspect of the present disclosure, a method for manufacturing a touch substrate is provided, and the method includes: forming an electrode pattern layer on a base substrate, wherein the electrode pattern layer includes body segments of a plurality of first electrodes extending in a first direction and body segments of a plurality of second electrodes extending in a second direction intersecting the first direction; forming an insulating layer on the electrode pattern layer; forming at least one pair of first via holes and at least one pair of second via holes in the insulating layer to expose a pair of first bridging areas of the first electrode and a pair of second bridging areas of the second electrode, respectively; and forming at least a part of at least one first conductive bridge and at least one second conductive bridge on a side of the insulating layer away from the base substrate, wherein each first conductive bridge is formed to electrically connect a pair of first bridging areas of one of the first electrodes exposed by a pair of first via holes, and each second conductive bridge is formed to electrically connect a pair of second bridging areas of one of the second electrodes exposed by a pair of second via holes, so that each first electrode and each second electrode intersect at a plurality of intersection areas on the touch substrate, and wherein in at least one intersection area, two adjacent body segments of one of the first electrodes are electrically connected through the first conductive bridge, and/or two adjacent body segments of one of the second electrodes are electrically connected through the second conductive bridge.

In some embodiments, an orthographic projection of the plurality of body segments of the each first electrode on the base substrate at least partially overlaps an orthographic projection of at least one of the at least one first conductive bridge on the base substrate, and an orthographic projection of the plurality of body segments of the each second electrode on the base substrate at least partially overlaps an orthographic projection of at least one of the at least one second conductive bridge on the base substrate.

In some embodiments, the first conductive bridge is only arranged in at least one of the plurality of intersection areas, the second conductive bridge is only arranged in at least one of the plurality of intersection areas, the plurality of intersection areas include a first intersection area in which the first conductive bridge is located and a second intersection area in which the second conductive bridge is located, and the first intersection area and the second intersection area are arranged alternately.

In some embodiments, at least one of the at least one first conductive bridge is formed in a non-intersection area of the first electrode, or at least one of the at least one second conductive bridge is formed in a non-intersection area of the second electrode In some embodiments, the first conductive bridge and the second conductive bridge are formed in at least one intersection area.

BRIEF DESCRIPTION OF THE DRAWINGS

In order to more clearly illustrate the technical solutions in the embodiments of the present disclosure or the related art, the drawings required in the description of the embodiments are briefly introduced below. Obviously, the drawings in the following description are some embodiments of the present disclosure. For those ordinary skilled in the art, other drawings may be obtained from these drawings without carrying out any inventive effort.

DETAILED DESCRIPTION OF EMBODIMENTS

In order to make the objectives, technical solutions and advantages of the present disclosure more clear, the technical solutions of the present disclosure are clearly and completely described below with reference to the accompanying drawings of the embodiments of the present disclosure. Obviously, the described embodiments are only a part but not all of the embodiments of the present disclosure. Based on the embodiments of the present disclosure, all other embodiments obtained by those ordinary skilled in the art without carrying out inventive effort fall within the protection scope of the present disclosure. It should be noted that throughout the accompanying drawings, same elements are represented by same or similar reference signs. In the following description, some embodiments are only used for descriptive purposes, and should not be construed as limiting the present disclosure. They are merely examples of the embodiments of the present disclosure. When it may cause confusion in the understanding of the present disclosure, conventional structures or configurations may be omitted. It should be noted that the shape and dimension of each component in the figures do not reflect the actual size and ratio, but merely illustrate the content of the embodiments of the present disclosure.

Unless otherwise defined, the technical or scientific terms used in the embodiments of the present disclosure should have the usual meanings understood by those skilled in the art. The words "first," "second," and the like used in the embodiments of the present disclosure do not indicate any order, quantity or importance, but are only used to distinguish different composition parts.

In addition, in the description of the embodiments of the present disclosure, the term "electrically connected" may mean that two components are electrically connected directly, or that two components are electrically connected via one or more other components.

The present disclosure will be described in detail below with reference to the drawings.

Figure 1A:
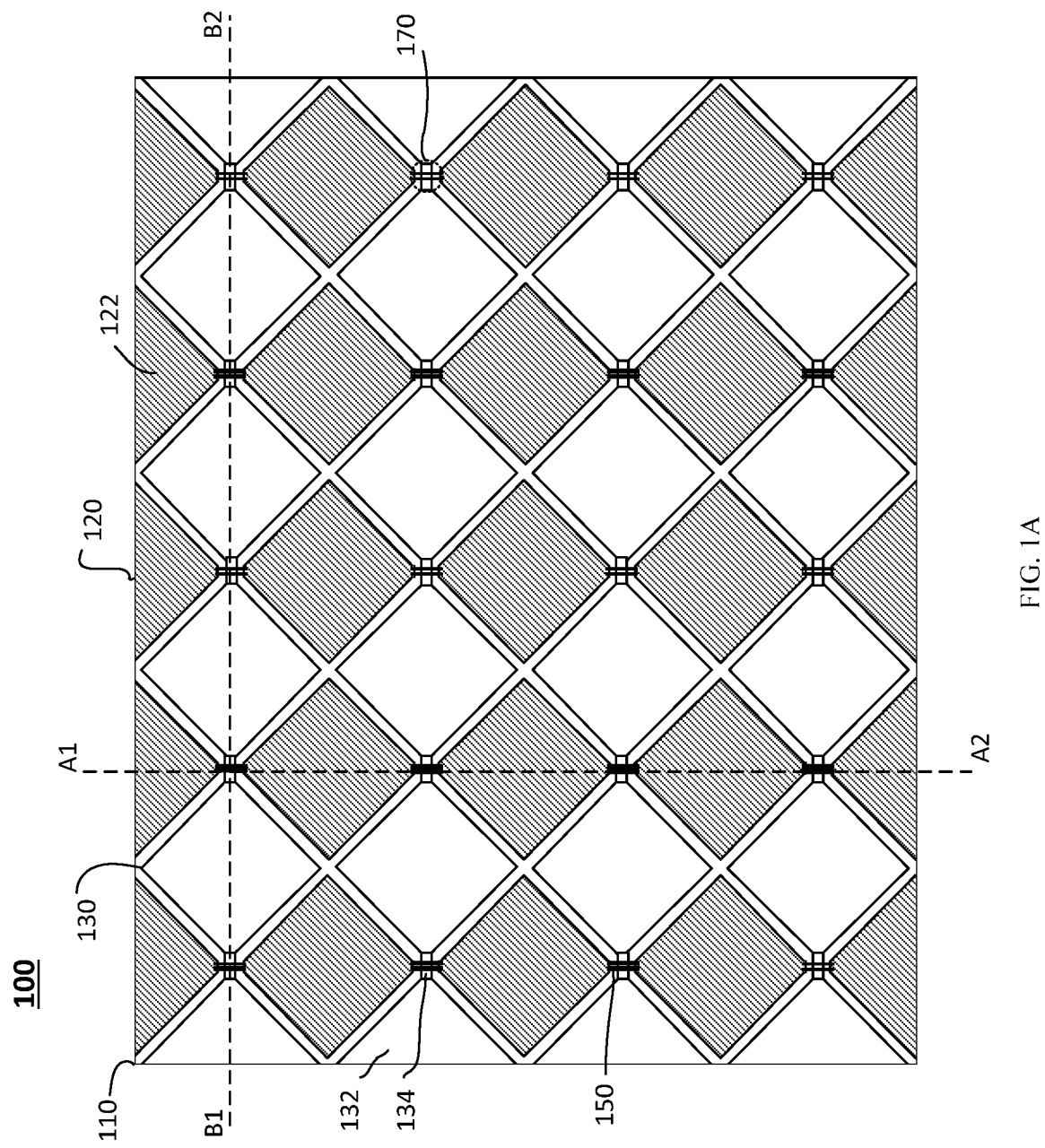
FIG. 1A shows a plan view of a touch substrate arranged according to a touch electrode arrangement scheme of FMLOC technology.
Figure 1B:
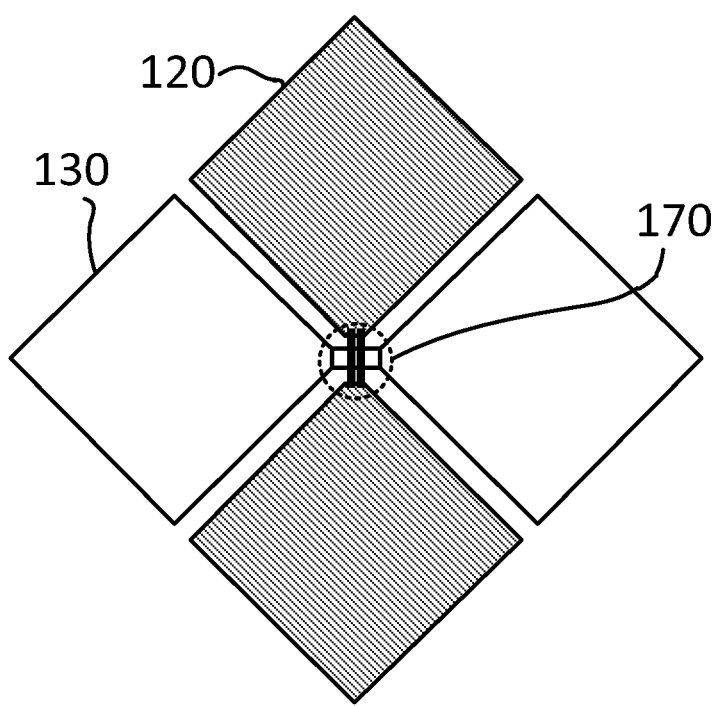
FIG. 1B shows an enlarged view of an intersection area of the touch substrate shown in FIG. 1.
Figure 1C:
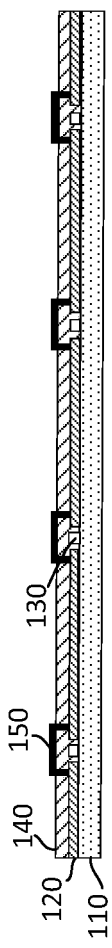
FIG. 1C shows a cross-sectional view of a touch substrate taken along line A1-A2.
Figure 1D:
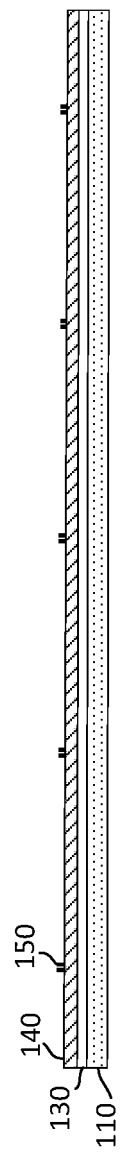
FIG. 1D shows a cross-sectional view of a touch substrate taken along line B1-B2.
Figure 1E:
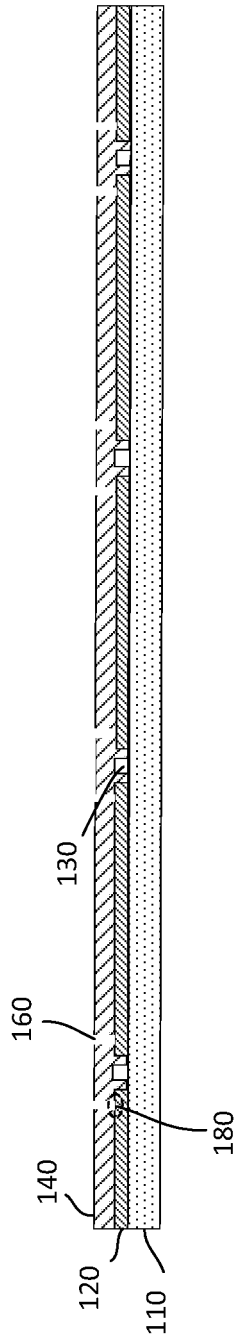
FIG. 1E shows a cross-sectional view of a touch substrate taken along line A1-A2 with conductive bridges removed.

FIG. 1A shows a plan view of a touch substrate 100 arranged according to a touch electrode arrangement scheme of FMLOC technology. FIG. 1B shows an enlarged view of an intersection area of the touch substrate 100 shown in FIG. 1A. FIG. 1C shows a cross-sectional view of the touch substrate 100 taken along line A1-A2. FIG. 1D shows a cross-sectional view of the touch substrate 100 taken along line B1-B2. FIG. 1E shows a cross-sectional view of the touch substrate 100 taken along line A1-A2 with conductive bridges removed. It should be understood that for ease of description, FIG. 1A exemplarily shows a total of four rows and five columns of touch electrodes, but the present disclosure is not limited thereto.

As shown in FIG. 1A to FIG. 1E, the touch substrate 100 includes a base substrate 110, a plurality of first electrodes 120, a plurality of second electrodes 130 and an insulating layer 140.

Each first electrode 120 extends in a first direction, and each second electrode 130 extends in a second direction that intersects the first direction. In some embodiments, the first direction is perpendicular to the second direction. For example, as illustrated in FIG. 1A, the first direction may be a width direction of the touch substrate 100, and the second direction may be a length direction of the touch substrate 100. In some embodiments, the first electrode 120 may be a transmitting electrode, and the second electrode 130 may be a receiving electrode.

Each first electrode 120 and each second electrode 130 intersect at an intersection area 170 on the touch substrate 100. Therefore, the plurality of first electrodes 120 and the plurality of second electrodes 130 form a plurality of intersection areas 170 on the touch substrate 100.

Each second electrode 130 includes a plurality of body segments 132 and a plurality of intersection segments 134, and the plurality of body segments 132 and the plurality of intersection segments 134 are alternately connected to form a second electrode 130. In the example of FIG. 1A, in order to facilitate a close arrangement of the electrodes, a width of the body segment 132 (that is, a dimension of the body segment 132 in a direction perpendicular to an extension direction of the second electrode 130) is greater than a width of the intersection segment 134. In the example of FIG. 1A, the shape of the body segment 132 is a rhombus, and the shape of the intersection segment 134 is a rectangle. Those skilled in the art should understand that, in other embodiments, the body segment 132 and the intersection segment 134 may have other shapes.

Each first electrode 120 includes a plurality of body segments 122 and at least one first conductive bridge 150. The body segments 122 of the each first electrode 120 are arranged in the first direction, and adjacent body segments 122 are disconnected to form a gap so as to accommodate the intersection segment 134 of the corresponding second electrode 130. In this way, the first electrode 120 and the second electrode 130 may be arranged in a same layer. The first conductive bridge 150 is used to realize an electrical connection of the body segments 122 in the first electrode 120, so that the electrically connected first electrode 120 may be used to realize a detection of a touch position.

In some embodiments, the body segment 122 of the first electrode 120 and the body segment 132 of the second electrode 130 are both arranged in an electrode pattern layer.

The insulating layer 140 is located on a side of the first electrode 120 and the second electrode 130 away from the base substrate 110 and covers the first electrode 120 and the second electrode 130. At least one pair of first via holes 160 are provided in the insulating layer 140. Each first via hole 160 passes through the insulating layer 140 so as to expose a part of the first electrode 120, and the exposed part may be referred to as a bridging area 180. One via hole in each pair of first via holes 160 is located on one of two adjacent body segments 122, and another via hole in each pair of first via holes 160 is located on another of the two adjacent body segments 122.

In some embodiments, a part of the first conductive bridge 150 is arranged on a side of the insulating layer 140 away from the base substrate 110 (a remaining part of the first conductive bridge 150 is located in the first via holes 160 as described below). An orthographic projection of the first conductive bridge 150 on the base substrate 110 at least partially overlaps an orthographic projection of a pair of first via holes 160 of the at least one pair of first via holes 160 in the insulating layer 140 on the base substrate 110, so that the first conductive bridge 150 may be electrically connected to a pair of bridging areas 180 on two adjacent body segments 122 of the first electrode 120 through the first via holes 160 that overlap the first conductive bridge 150, thereby achieving an electrical connection between the adjacent body segments 122 in the first electrode 120. In FIG. 1A, two first conductive bridges 150 are exemplarily provided in parallel between adjacent body segments 122 of the first electrode 120. Those skilled in the art should understand that, in other embodiments of the present disclosure, one or more than two first conductive bridges 150 may be provided between adjacent body segments 122 of the first electrode 120.

As described above, in the example of FIG. 1A to FIG. 1E, the first conductive bridges 150 are provided on the first electrode 120 to realize a bridge connection between the body segments 122 of the first electrode 120, but no bridging design is made for the second electrode 130. Accordingly, static electricity is likely to accumulate on the second electrode 130 during the process, which may have a serious influence on a signal of the electrode pattern layer.

The embodiments of the present disclosure provide a touch substrate in which such accumulation of static electricity may be suppressed. The touch substrate is provided with bridge structures on each transmitting electrode (or called the first electrode) and all or part of the receiving electrodes (or called the second electrode), and an influence of the static electricity on a touch signal may be effectively suppressed on the receiving electrodes provided with the bridge structures. In the following embodiments, each second electrode is provided with a bridge structure. However, those skilled in the art should understand that, in other embodiments of the present disclosure, the bridge structure may be provided on a part (for example, one) of the second electrodes.

For example, in addition to the base substrate, the first electrode, the second electrode and the insulating layer shown in FIG. 1, the touch substrate according to the embodiments of the present disclosure further includes at least one second conductive bridge provided on the second electrode.

In the intersection areas formed by the intersection of the first electrode and the second electrode, one of the intersected first electrode and second electrode needs to be disconnected. If the first electrode is disconnected, disconnected electrode portion are electrically connected through the first conductive bridge. If the second electrode is disconnected, disconnected electrode portion are electrically connected through the second conductive bridge.

In some embodiments, the first conductive bridge or the second conductive bridge may be provided in an intersection area. In other embodiments, in addition to provide the conductive bridge in an intersection area, the first conductive bridge or the second conductive bridge may also be provided in a non-intersection area (for example, a body segment) of the first electrode or the second electrode, so as to ensure that each electrode has a bridge structure. By providing the bridge structure on each electrode, a generation of electro-static discharge on the electrode may be suppressed, thereby avoiding the influence on the electrode signal.

Figure 2A:
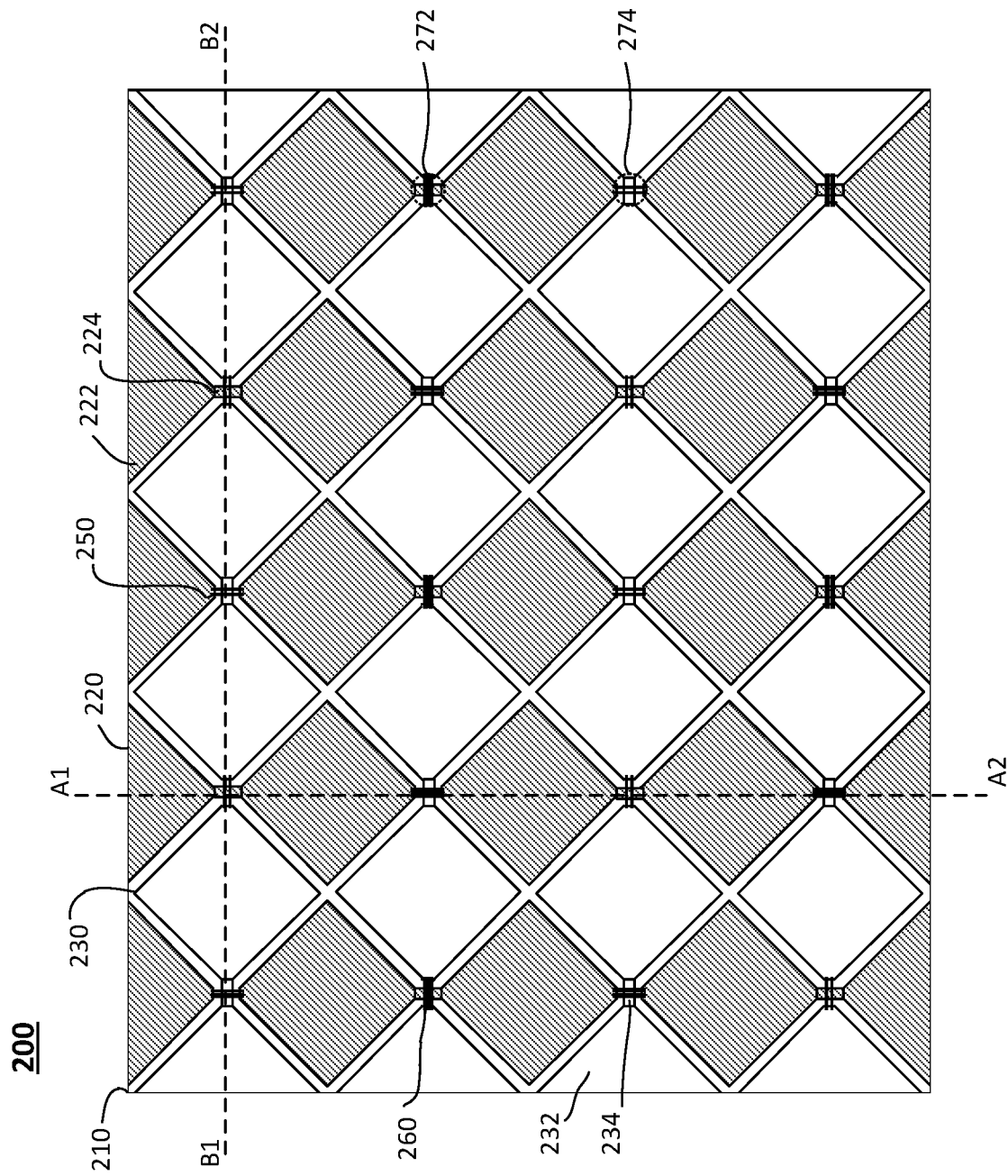
FIG. 2A shows a plan view of a touch substrate according to the embodiments of the present disclosure.
Figure 2B:
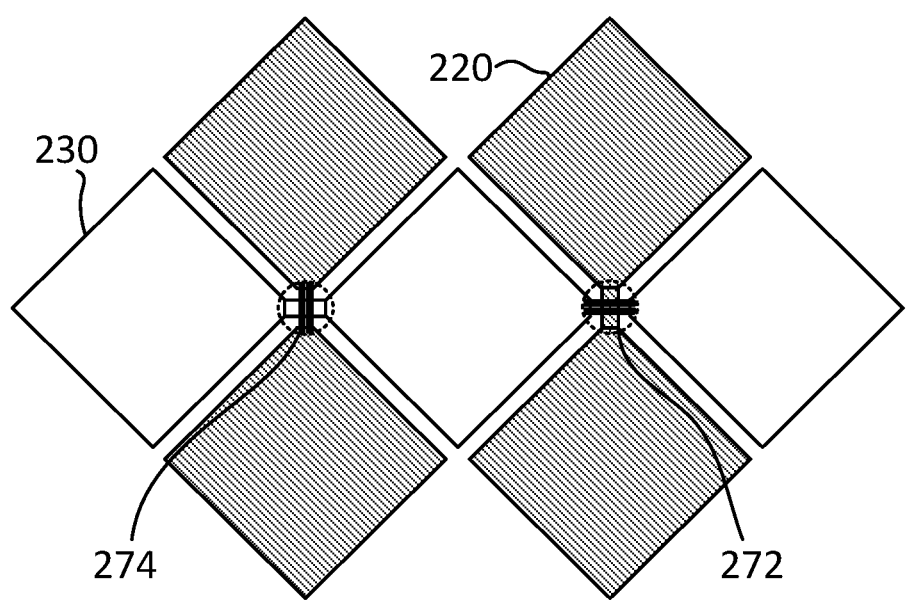
FIG. 2B shows an enlarged view of an intersection area of a touch substrate shown in FIG. 2A.
Figure 2C:
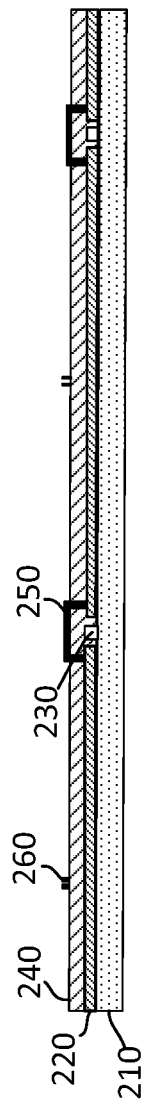
FIG. 2C shows a cross-sectional view of a touch substrate taken along line A1-A2.
Figure 2D:
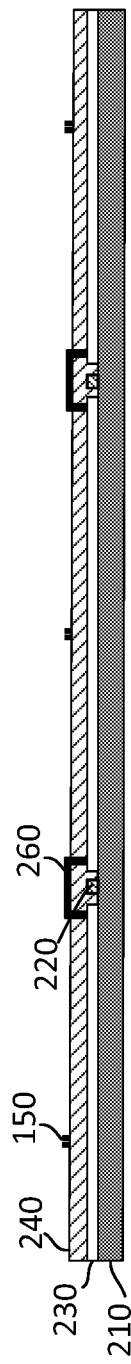
FIG. 2D shows a cross-sectional view of a touch substrate taken along line B1-B2.
Figure 2E:
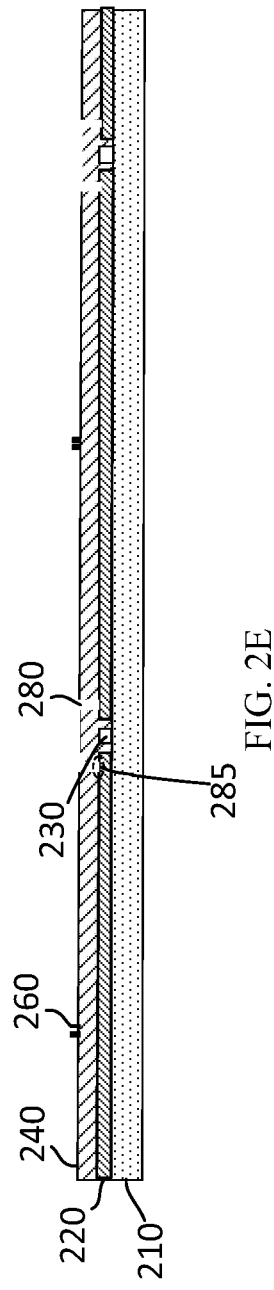
FIG. 2E shows a cross-sectional view of a touch substrate taken along line A1-A2 with first conductive bridges removed.
Figure 2F:
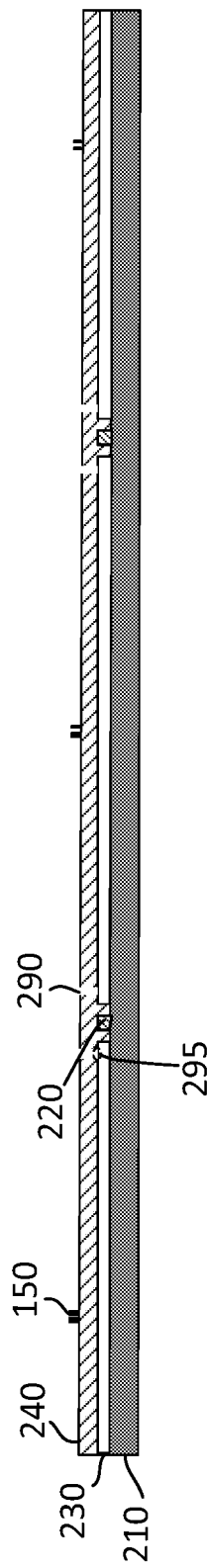
FIG. 2F shows a cross-sectional view of a touch substrate taken along line A1-A2 with second conductive bridges removed.

FIG. 2A shows a plan view of a touch substrate 200 according to the embodiments of the present disclosure. FIG. 2B shows an enlarged view of intersection areas of the touch substrate 200 shown in FIG. 2A. FIG. 2C shows a cross-sectional view of the touch substrate 200 taken along line A1-A2. FIG. 2D shows a cross-sectional view of the touch substrate 200 taken along line B1-B2. FIG. 2E shows a cross-sectional view of the touch substrate 200 taken along line A1-A2 with the first conductive bridge removed. FIG. 2F shows a cross-sectional view of the touch substrate 200 taken along line A1-A2 with the second conductive bridge removed. In the embodiment shown in FIG. 2A to FIG. 2F, a conductive bridge is arranged in an intersection area.

As shown in FIG. 2A to FIG. 2F, the touch substrate 200 includes a base substrate 210, a plurality of first electrodes 220, a plurality of second electrodes 230 and an insulating layer 240.

Each first electrode 220 extends in a first direction, and each second electrode 230 extends in a second direction that intersects the first direction. In some embodiments, the first direction is perpendicular to the second direction. For example, as illustrated in FIG. 2A, the first direction may be a width direction of the touch substrate 200, and the second direction may be a length direction of the touch substrate 200. In some embodiments, the first electrode 220 may be a transmitting electrode, and the second electrode 230 may be a receiving electrode.

Each first electrode 220 includes a plurality of body segments 222, a plurality of intersection segments 224 and at least one first conductive bridge 250. Each intersection segment 224 is connected between two adjacent body segments 222. In the embodiment of FIG. 2A, on a side of each body segment 222, each body segment 222 is connected to an adjacent body segment 222 through an intersection segment 224, and on another side of the each body segment 222, a gap is formed between the each body segment 222 and another adjacent body segment 222 to accommodate the intersection segment 234 of the corresponding second electrode 230. The at least one first conductive bridge 250 is used to realize the electrical connection of the disconnected body segments 222 in the first electrode 220, so that the electrically connected first electrode 220 may be used to realize the detection of the touch position.

Each second electrode 230 includes a plurality of body segments 232, a plurality of intersection segments 234 and at least one second conductive bridge 260. Each intersection segment 234 is connected between two adjacent body segments 232. In the embodiment of FIG. 2A, on a side of each body segment 232, each body segment 232 is connected to an adjacent body segment 232 through an intersection segment 234, and on another side of the each body segment 232, a gap is formed between the each body segment 232 and another adjacent body segment 222 to accommodate the intersection segment 224 of the corresponding first electrode 220. The second conductive bridge 260 is used to realize the electrical connection of the disconnected body segments 232 in the second electrode 230, so that the electrically connected second electrode 230 may be used to realize the detection of the touch position.

In some embodiments, the body segment 222 of the first electrode 220 and the body segment 232 of the second electrode 230 are both arranged in the electrode pattern layer.

As shown in FIG. 2A, the intersection segment 224 of each first electrode 220 intersects the second conductive bridge 260 at the first intersection area 272 on the touch substrate 200. The intersection segment 234 of each second electrode 230 intersects the first conductive bridge 250 at the second intersection area 274 on the touch substrate 200. In the embodiment shown in FIG. 2A, the intersection segments 224, 234 are located in the first intersection area 272 and the second intersection area 274, respectively. As described above, in the first intersection area 272 and the second intersection area 274 that are adjacent in the first direction or the second direction, the disconnected electrodes are different electrodes, and the intersection segments (the intersection segments 224, 234) belong to different electrodes.

In order to facilitate compact arrangement of the electrodes, widths of the body segments 222 and 232 (that is, dimensions in the direction perpendicular to the extension direction of the electrodes) are greater than widths of the intersection segments 224, 234. In the example of FIG. 2A, shapes of the body segments 222, 232 are a rhombus, and shapes of the intersection segments 224, 234 are a rectangle. Those skilled in the art should understand that, in other embodiments, the body segments 222, 232 and the intersection segments 224, 234 may have other shapes.

It should be understood that, although in the embodiment shown in FIG. 2A, different electrodes are disconnected in the adjacent first intersection area 272 and second intersection area 274, it should be understood that, in other embodiments of the present disclosure, it is possible to disconnect the second electrode instead of the first electrode in some of the intersection areas, or disconnect the first electrode instead of the second electrode in some of the intersection areas, as long as each first electrode and each second electrode includes a disconnected portion (thereby providing a conductive bridge on the electrode to form a bridge structure).

The insulating layer 240 is located on a side of the first electrode 220 and the second electrode 230 away from the base substrate 210 and covers the first electrode 220 and the second electrode 230. At least one pair of first via holes 280 are provided in the insulating layer 240. Each first via hole 280 passes through the insulating layer 240 so as to expose a part of the first electrode 220, and the exposed part may be referred to as a first bridging area 285 of the first electrode. One via hole in each pair of first via holes 280 is located on one of two adjacent body segments 222, and another via hole in each pair of first via holes 280 is located on another of the two adjacent body segments 222. At least one pair of second via holes 290 are further provided in the insulating layer 240. Each second via hole 290 passes through the insulating layer 240 so as to expose a part of the second electrode 230, and the exposed part may be referred to as a second bridging area 295 of the second electrode. One via hole in each pair of first via holes 290 is located on one of two adjacent body segments 232, and another via hole in each pair of first via holes 290 is located on another of the two adjacent body segments 232.

In some embodiments, a part of the first conductive bridge 250 is arranged on a side of the insulating layer 240 away from the base substrate 210 (a remaining part of the first conductive bridge 250 is located in the first via holes 280 as described below). An orthographic projection of the first conductive bridge 250 on the base substrate 210 at least partially overlaps an orthographic projection of a pair of first via holes 280 of the at least one pair of first via holes 280 in the insulating layer 240 on the base substrate 210, so that the first conductive bridge 250 may be electrically connected to a pair of first bridging areas 285 on two disconnected body segments 222 of the first electrode 220 through the first via holes 280 that overlap the first conductive bridge 150, thereby achieving the electrical connection between the body segments 222 in the first electrode 220. In FIG. 2A, two first conductive bridges 250 are exemplarily arranged in parallel between disconnected body segments 222 of the first electrode 220. Those skilled in the art should understand that, in other embodiments of the present disclosure, one or more than two first conductive bridges 250 may be provided between the disconnected body segments 222 of the first electrode 220.

In some embodiments, a part of the second conductive bridge 260 is arranged on a side of the insulating layer 240 away from the base substrate 210 (a remaining part of the second conductive bridge 260 is located in the second via holes 290 as described below). An orthographic projection of the second conductive bridge 260 on the base substrate 210 at least partially overlaps an orthographic projection of a pair of second via holes 290 of the at least one pair of second via holes 290 in the insulating layer 240 on the base substrate 210, so that the second conductive bridge 260 may be electrically connected to a pair of second bridging areas 295 on two disconnected body segments 232 of the second electrode 230 through the second via holes 290 that overlap the second conductive bridge 260, thereby achieving the electrical connection between the body segments 232 in the second electrode 230. In FIG. 2A, two second conductive bridges 260 are exemplarily arranged in parallel between the disconnected body segments 232 of the second electrode 230. Those skilled in the art should understand that in other embodiments of the present disclosure, one or more than two second conductive bridges 260 may be provided between the disconnected body segments 232 of the second electrode 230.

In the embodiment shown in FIG. 2A to FIG. 2F, by disconnecting the second electrode instead of disconnecting the first electrode in half of the intersection areas, the generation of electro-static discharge is suppressed without increasing the conductive bridges on the whole structure, which may not increase additional structural complexity.

Figure 3A:
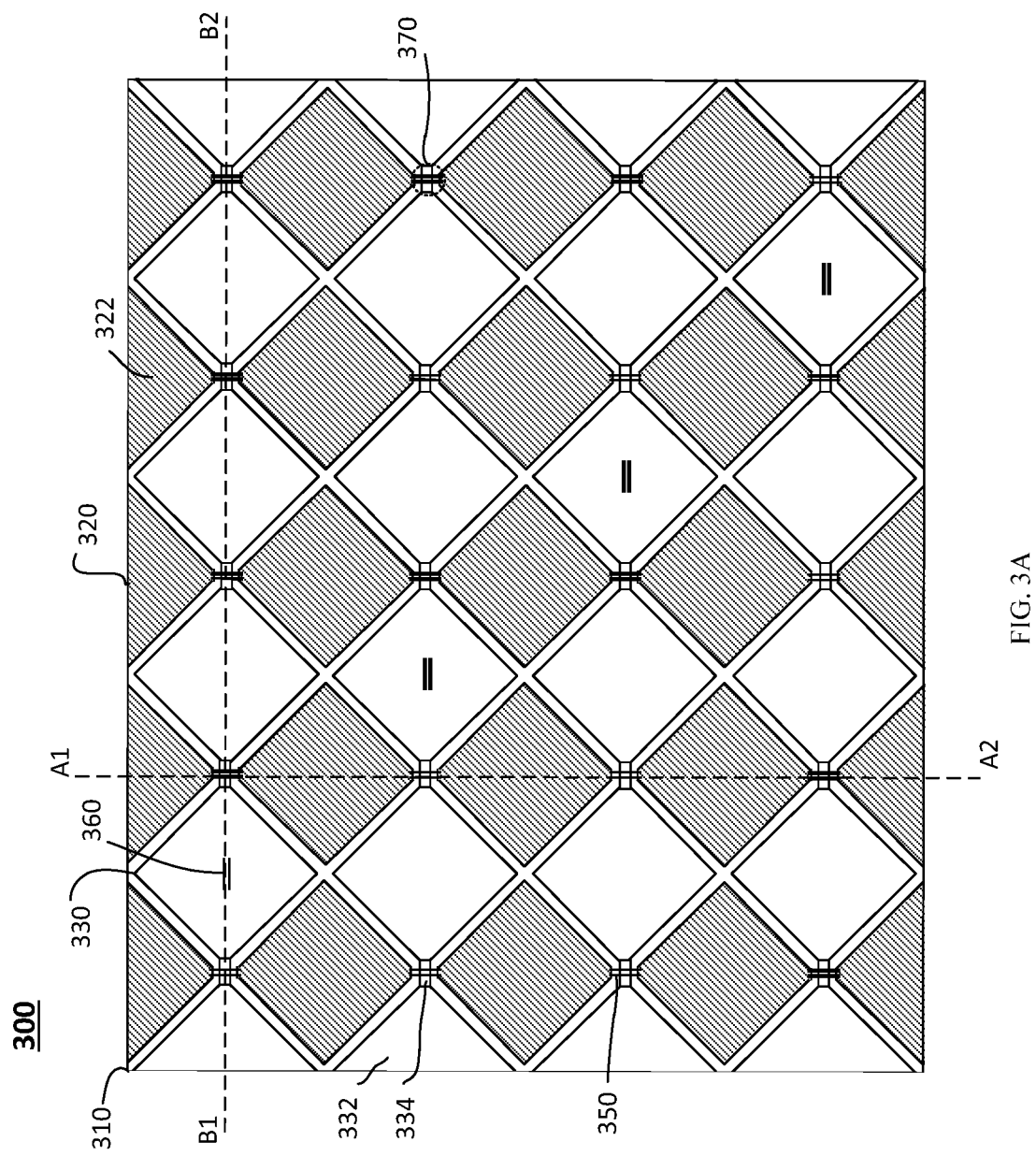
FIG. 3A shows a plan view of a touch substrate according to the embodiments of the present disclosure.
Figure 3B:
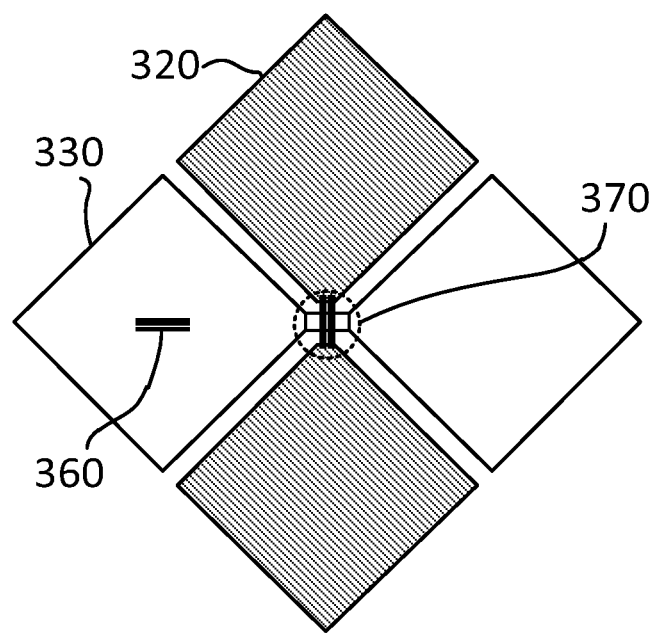
FIG. 3B shows an enlarged view of an intersection area and an additional conductive bridge of the touch substrate shown in FIG. 3A.
Figure 3C:
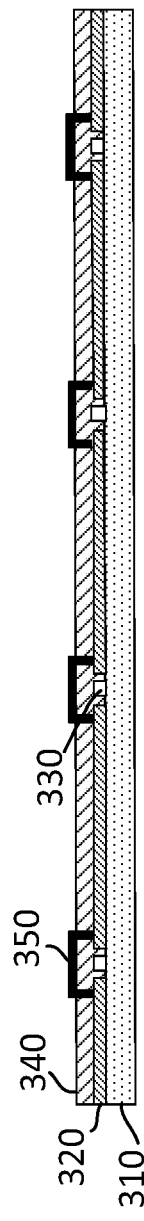
FIG. 3C shows a cross-sectional view of a touch substrate taken along line A1-A2.
Figure 3D:
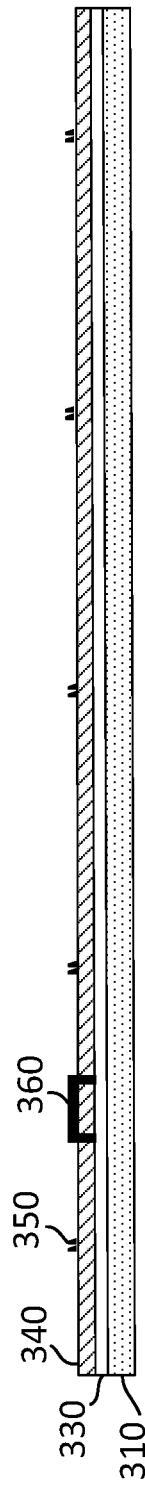
FIG. 3D shows a cross-sectional view of a touch substrate taken along line B1-B2.
Figure 3E:
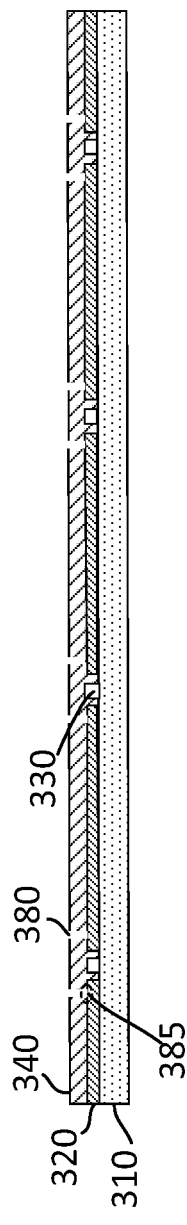
FIG. 3E shows a cross-sectional view of a touch substrate taken along line A1-A2 with first conductive bridges removed.
Figure 3F:
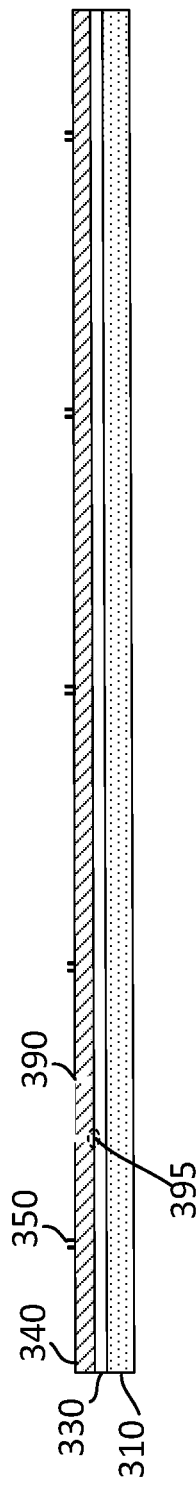
FIG. 3F shows a cross-sectional view of a touch substrate taken along line B1-B2 with second conductive bridges removed.

FIG. 3A shows a plan view of a touch substrate 300 according to the embodiments of the present disclosure. FIG. 3B shows an enlarged view of an intersection area and an additional conductive bridge of the touch substrate 300 shown in FIG. 3A. FIG. 3C shows a cross-sectional view of the touch substrate 300 taken along line A1-A2. FIG. 3D shows a cross-sectional view of the touch substrate 300 taken along line B1-B2. FIG. 3E shows a cross-sectional view of the touch substrate 300 taken along line A1-A2 with the first conductive bridge removed. FIG. 3F shows a cross-sectional view of the touch substrate 300 taken along line B1-B2 with the second conductive bridge removed. In the embodiment shown in FIG. 3A to FIG. 3F, in addition to provide conductive bridges in the intersection areas, conductive bridges are further provided in some non-intersection areas of some electrodes. There is no electrode disconnection at the additional conductive bridges, and the additional conductive bridges are used to implement bridge structures.

As shown in FIG. 3A to FIG. 3F, the touch substrate 300 includes a base substrate 310, a plurality of first electrodes 320, a plurality of second electrodes 330 and an insulating layer 340. Compared the touch substrate 300 in FIG. 3A to FIG. 3F with the touch substrate 100 in FIG. 1A to FIG. 1E, the base substrate 310, the plurality of first electrodes 320, the plurality of second electrodes 330, the insulating layer 340 and the at least one first conductive bridge 350 respectively correspond to the base substrate 110, the plurality of first electrodes 120, the plurality of second electrodes 130, the insulating layer 140 and the at least one first conductive bridge 150. In other words, the touch substrate 300 is additionally provided with at least one second conductive bridge 360 on the basis of the touch substrate 100. For the description of the plurality of first electrodes 320, the plurality of second electrodes 330 and the insulating layer 340, reference may be made to the above, which will not be repeated here.

The second conductive bridge 360 is located in a non-intersection area of the second electrode 330, that is, on a body segment 322 of the second electrode 330.

For example, an orthographic projection of the first conductive bridge 350 on the base substrate 310 at least partially overlaps an orthographic projection of a pair of first via holes 380 of the at least one pair of first via holes 380 in the insulating layer 340 on the base substrate 310, so that the first conductive bridge 350 may be electrically connected to a pair of first bridging areas 385 on two disconnected body segments 322 of the first electrode 320 through the first via holes 380 that overlap the first conductive bridge 350, thereby achieving the electrical connection between the body segments 322 of the first electrode 320. In addition to the first via holes 380 located on the first electrode 320, at least one pair of second via holes 390 are further provided in the insulating layer 340. The second via holes 390 pass through the insulating layer 340 so as to expose a part of the second electrode 330, and the exposed part may be referred to as a second bridging area 395 of the second electrode. Both via holes of each pair of second via holes 390 are located in a same body segment 332 of the second electrode 330. The second conductive bridge 360 is arranged on a side of the insulating layer 340 away from the base substrate 310. An orthographic projection of the second conductive bridge 360 on the base substrate 310 at least partially overlaps a pair of second via holes 390 of the at least one pair of second via holes 390 in the insulating layer 340 on the base substrate 310, so that the pair of second via holes 390 may form a bypass connection on the second electrode 330 through the second conductive bridge 360. In FIG. 3A, two second conductive bridges 360 are exemplarily arranged in parallel on the body segment 332 of the second electrode 330. Those skilled in the art should understand that, in other embodiments of the present disclosure, one or more than two second conductive bridges 360 may be provided on the body segment 332 of the second electrode 330.

Although in the embodiment of FIG. 3A to FIG. 3F, the second conductive bridge 360 is provided on one body segment 332 of each second electrode 330, it should be understood that in other embodiments, at least one second conductive bridge 360 may be provided on one or more body segments 332 of each second electrode 330.

In the embodiment of FIG. 3A to FIG. 3F, the first electrode 320 is disconnected in the intersection areas 370, so that the electro-static discharge may be suppressed by providing the additional second conductive bridge 360 on the body segment 332 of the second electrode 330 that is not disconnected. It should be understood that in other embodiments, the disconnection of the electrodes in respective intersection areas (that is, whether the first electrode is disconnected or the second electrode is disconnected) may be designed as required. After the disconnection of the electrodes in the intersection areas is determined, the conductive bridge (the first conductive bridge or the second conductive bridge) may be provided on a body segment of an electrode (the first electrode or the second electrode) that is not disconnected in any intersection area. The conductive bridge provided may be similar to the second conductive bridge 360 in the embodiment of FIG. 3A to FIG. 3F.

In the embodiment of FIG. 3A to FIG. 3F, the additional conductive bridge (that is, the second conductive bridge 360) is arranged on the body segment 332 of the second electrode 330. It should be understood that in other embodiments, the second conductive bridge 360 may be arranged on the intersection segment 334 of the second electrode 330. In this case, a space on the intersection segment 334 needs to be reasonably arranged to avoid an overlap between the second conductive bridge 360 and the first conductive bridge 350 across the intersection segment 334.

Figure 4:
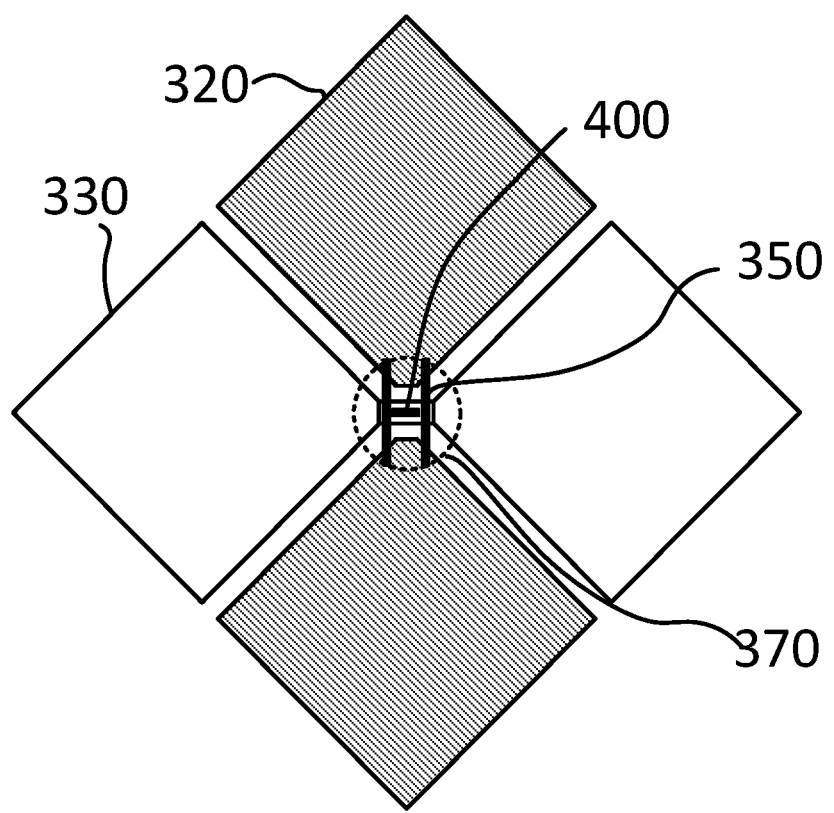
FIG. 4 shows a schematic diagram of an intersection area provided with an additional second conductive bridge.

For example, FIG. 4 shows a schematic diagram of an intersection area provided with the additional second conductive bridge. As shown, two first conductive bridges 350 are provided across the second electrode 330 in the intersection area 370, and an additional second conductive bridge 400 is provided between the two first conductive bridges 350 on (the intersection segment 334 of) the second electrode 330. Here, an orthographic projection of the first conductive bridge 350 on the base substrate 310 may not overlap an orthographic projection of the additional second conductive bridge 400 on the base substrate 310.

It should be understood that in other embodiments, the second electrode may be disconnected in the intersection area. In this case, one or at least one second conductive bridge 360 may be provided across the first electrode, and one or at least one first conductive bridge 350 is provided on the first electrode (for example, at the intersection segment), without overlapping the second conductive bridge 360.

Figure 5:
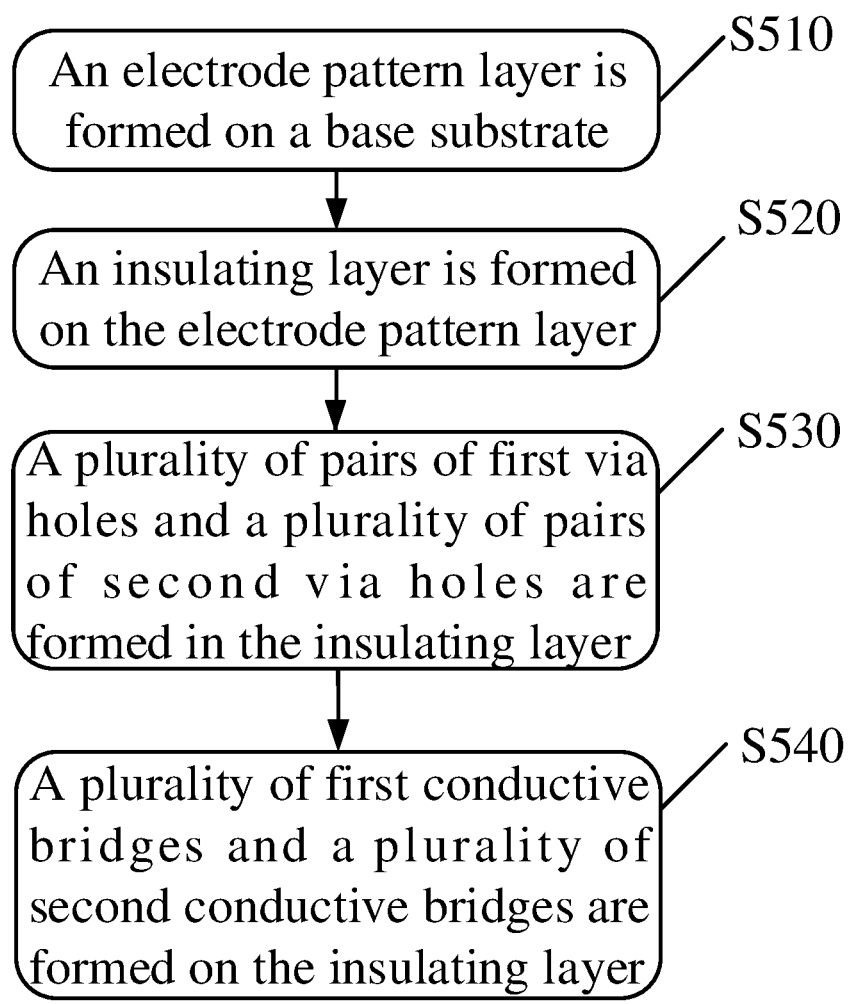
FIG. 5 shows a flowchart of a method for manufacturing a touch substrate according to the embodiments of the present disclosure.

FIG. 5 shows a flowchart of a method 500 for manufacturing a touch substrate according to the embodiments of the present disclosure. The method 500 may be used to manufacture the touch substrate according to the embodiments shown in FIG. 2A to FIG. 4. Therefore, the above explanations and descriptions are equally applicable here.

The method 500 includes step S510 to step S540.

In step S510, an electrode pattern layer is formed on a base substrate.

The electrode pattern layer includes body segments of a plurality of first electrodes extending in a first direction and body segments of a plurality of second electrodes extending in a second direction intersecting the first direction.

In step S520, an insulating layer is formed on a side of the electrode pattern layer away from the base substrate.

In step S530, at least one pair of first via holes and at least one pair of second via holes are formed in the insulating layer to expose a first bridging area of the first electrode and a second bridging area of the second electrode, respectively.

In step S540, at least a part of at least one first conductive bridge and at least one second conductive bridge is formed on a side of the insulating layer away from the base substrate. Each first conductive bridge is formed to electrically connect a pair of first bridging areas of a first electrode exposed by a pair of first via holes, and each second conductive bridge is formed to electrically connect a pair of second bridging areas of a second electrode exposed by a pair of second via holes, so that each first electrode and each second electrode intersect at a plurality of intersection areas on the touch substrate. In at least one intersection area, two adjacent body segments of one of the first electrodes are electrically connected through the first conductive bridge, and/or two adjacent body segments of one of the second electrodes are electrically connected through the second conductive bridge.

In some embodiments, a width of the intersection segment in the intersection area is smaller than a width of the body segment in the non-intersection area.

In some embodiments, an orthographic projection of the each first electrode on the base substrate at least partially overlaps an orthographic projection of at least one of the at least one first conductive bridge on the base substrate, and an orthographic projection of the each second electrode on the base substrate at least partially overlaps an orthographic projection of at least one of the at least one second conductive bridge on the base substrate.

In some embodiments, the first conductive bridge is only formed in the intersection area where the first electrode is disconnected, so as to connect the disconnected first electrode. The second conductive bridge is only formed in the intersection area where the second electrode is disconnected, so as to connect the disconnected second electrode.

In some embodiments, in the intersection areas of the plurality of intersection areas that are adjacent in the first direction or the second direction, the disconnected electrodes are different electrodes.

In some embodiments, at least one of the at least one first conductive bridge is formed in the non-intersection area of the first electrode.

In some embodiments, at least one of the at least one second conductive bridge is formed in the non-intersection area of the second electrode.

In some embodiments, the first conductive bridge and the second conductive bridge are formed in each of the at least one intersection area of the plurality of intersection areas.

In some embodiments, the disconnected electrode in each intersection area is electrically connected by at least one first conductive bridge or at least one second conductive bridge arranged in parallel.

Figure 6:
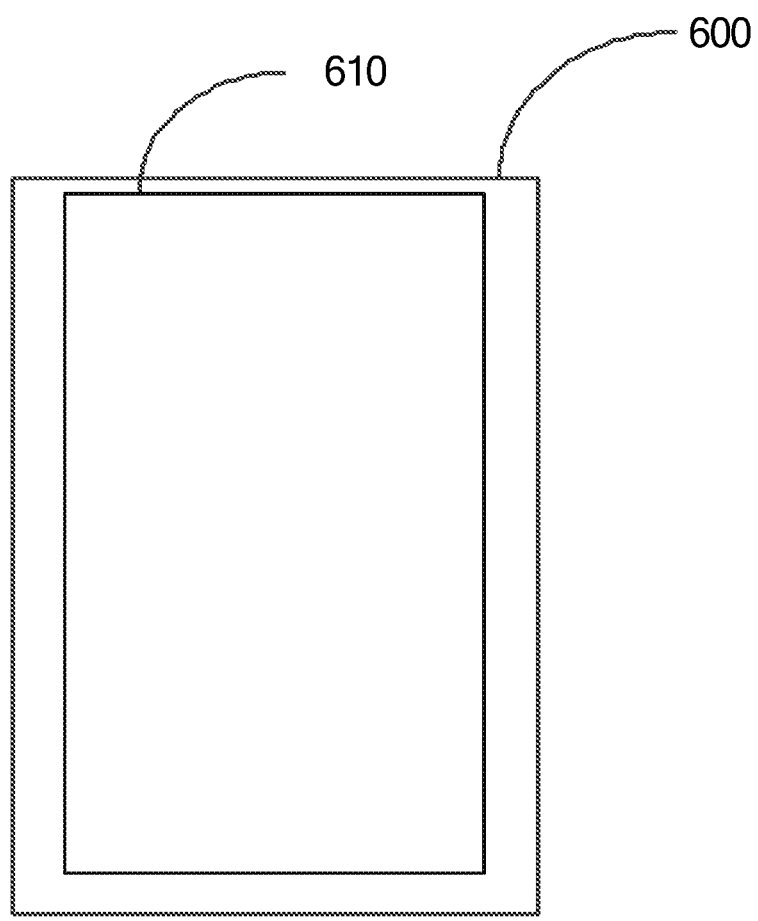
FIG. 6 shows a schematic block diagram of a display device according to the embodiments of the present disclosure.

FIG. 6 shows a schematic block diagram of a display device 600 according to the embodiments of the present disclosure. As shown in FIG. 6, the display device 600 includes a touch substrate 610. The touch substrate 610 may be implemented by the touch substrate according to the embodiments of the present disclosure. The display device 600 according to the embodiments of the present disclosure may be any product or component with a touch display function, such as electronic paper, a mobile phone, a tablet computer, a television, a display, a notebook computer, a digital photo frame, a navigator, and the like.

Although the present disclosure is described with reference to several conventional embodiments, it should be understood that the terms used are illustrative and exemplary rather than restrictive. Since the present disclosure may be implemented in various forms without departing from the spirit or essence of the present disclosure, it should be understood that the embodiments described above are not limited to any of the foregoing details, but should be interpreted broadly within the spirit and scope defined by the appended claims. Therefore, all changes and modifications falling within the scope of the claims or their equivalents shall be covered by the appended claims.

What is claimed is:

1. A touch substrate, comprising:
 a base substrate;
 a plurality of first electrodes arranged on the base substrate, wherein each first electrode of the plurality of first electrodes extends in a first direction, and each first electrode comprises a plurality of first body segments;
 a plurality of second electrodes arranged on the base substrate, wherein each second electrode of the plurality of second electrodes extends in a second direction intersecting the first direction, each second electrode comprises a plurality of second body segments arranged in a same electrode pattern layer as the plurality of first body segments of each first electrode, and the plurality of first electrodes and the plurality of second electrodes intersect at a plurality of intersection areas on the touch substrate; and
 an insulating layer arranged on a side of an electrode pattern layer comprising the first body segments and the second body segments, away from the base substrate and provided with at least one pair of first via holes and at least one pair of second via holes, wherein a pair of first via holes of the at least one pair of first via holes exposes a pair of first bridging areas of the first electrode, and a pair of second via holes of the at least one pair of second via holes exposes a pair of second bridging areas of the second electrode;
 wherein each first electrode of the plurality of first electrodes comprises at least one first conductive bridge, a part of each first conductive bridge is arranged on a side of the insulating layer away from the base substrate, an orthographic projection of each first conductive bridge on the base substrate at least partially overlaps an orthographic projection of the pair of first via holes on the base substrate, and each first conductive bridge is configured to electrically connect a pair of first bridging areas exposed by the pair of first via holes;
 wherein each second electrode of the plurality of second electrodes comprises at least one second conductive bridge, a part of each second conductive bridge is arranged on the side of the insulating layer away from the base substrate, an orthographic projection of each second conductive bridge on the base substrate at least partially overlaps an orthographic projection of the pair of second via holes on the base substrate, and each second conductive bridge is configured to electrically connect a pair of second bridging areas exposed by the pair of second via holes; and
 wherein in at least one intersection area of the plurality of intersection areas, two adjacent first body segments of one of the first electrodes are electrically connected through the first conductive bridge, and at least one second conductive bridge is arranged in a non-intersection area of the second electrode and in contact with a second body segment of the second electrode, and an orthographic projection of the at least one second conductive bridge on the base substrate falls within an orthographic projection of the second body segment of the second electrode on the base substrate, the at least one second conductive bridge is arranged in a same layer as the first conductive bridge, and the at least one second conductive bridge is arranged in a different layer from the second body segment of the second electrode; and/or
 two adjacent second body segments of one of the second electrodes are electrically connected through the second conductive bridge, and at least one first conductive bridge is arranged in a non-intersection area of the first electrode and in contact with a first body segment of the first electrode, and an orthographic projection of the at least one first conductive bridge on the base substrate falls within an orthographic projection of the first body segment of the first electrode on the base substrate, the at least one first conductive bridge is arranged in a same layer as the second conductive bridge, and the at least one first conductive bridge is arranged in a different layer from the first body segment of the first electrode.

2. The touch substrate of claim 1, wherein an orthographic projection of the plurality of first body segments of the one of the first electrodes on the base substrate at least partially overlaps an orthographic projection of the first conductive bridge electrically connecting the two adjacent first body segments of the one of the first electrodes on the base substrate, or an orthographic projection of the plurality of second body segments of the one of the second electrodes on the base substrate at least partially overlaps an orthographic projection of the second conductive bridge electrically connecting the two adjacent second body segments of the one of the second electrodes on the base substrate.

3. The touch substrate of claim 1, wherein the plurality of intersection areas comprise a first intersection area in which the first conductive bridge electrically connecting the two adjacent first body segments of the one of the first electrodes is located and a second intersection area in which the second conductive bridge electrically connecting the two adjacent second body segments of the one of the second electrodes is located, and the first intersection area and the second intersection area are arranged alternately.

4. The touch substrate of claim 1, wherein
 each first electrode further comprises a first intersection segment connected between two adjacent first body segments of the one of the first electrodes and an additional first conductive bridge on the first intersection segment, and the additional first conductive bridge and the second conductive bridge electrically connecting the two adjacent second body segments of the one of the second electrodes are arranged in one intersection area of the plurality of intersection areas; or
 each second electrode further comprises a second intersection segment connected between two adjacent second body segments of the one of the second electrodes and an additional second conductive bridge on the second intersection segment, and the additional second conductive bridge and the first conductive bridge electrically connecting the two adjacent first body segments of the one of the first electrodes are arranged in one intersection area of the plurality of intersection areas.

5. The touch substrate of claim 4, wherein an orthographic projection of the additional first conductive bridge in the intersection area on the base substrate does not overlap an orthographic projection of the second conductive bridge electrically connecting the two adjacent second body segments of the one of the second electrodes in the one intersection area on the base substrate; or an orthographic projection of the additional second conductive bridge in the intersection area on the base substrate does not overlap an orthographic projection of the first conductive bridge electrically connecting the two adjacent first body segments of the one of the first electrodes in the one intersection area on the base substrate.

6. The touch substrate of claim 1, wherein two adjacent first body segments of the one of the first electrodes are electrically connected by a pair of first conductive bridges arranged in parallel; or two adjacent second body segments of the one of the second electrodes are electrically connected by a pair of second conductive bridges arranged in parallel.

7. A display device, comprising the touch substrate of claim 1.

8. A method for manufacturing a touch substrate, comprising:

forming an electrode pattern layer on a base substrate, wherein the electrode pattern layer comprises first body segments of a plurality of first electrodes extending in a first direction and second body segments of a plurality of second electrodes extending in a second direction intersecting the first direction;

forming an insulating layer on the electrode pattern layer;

forming at least one pair of first via holes and at least one pair of second via holes in the insulating layer to expose a pair of first bridging areas of the first electrode and a pair of second bridging areas of the second electrode, respectively; and forming at least a part of at least one first conductive bridge and at least one second conductive bridge on a side of the insulating layer away from the base substrate, wherein each first conductive bridge is formed to electrically connect a pair of first bridging areas of one of the first electrodes exposed by a pair of first via holes, and each second conductive bridge is formed to electrically connect a pair of second bridging areas of one of the second electrodes exposed by a pair of second via holes, so that each first electrode and each second electrode intersect at a plurality of intersection areas on the touch substrate, wherein in at least one intersection area of the plurality of intersection areas, two adjacent first body segments of one of the first electrodes are electrically connected through the first conductive bridge, and at least one second conductive bridge is arranged in a non-intersection area of the second electrode and in contact with a second body segment of the second electrode, and an orthographic projection of the at least one second conductive bridge on the base substrate falls within an orthographic projection of the second body segment of the second electrode on the base substrate, the at least one second conductive bridge is arranged in a same layer as the first conductive bridge, and the at least one second conductive bridge is arranged in a different layer from the second body segment of the second electrode; and/or two adjacent second body segments of one of the second electrodes are electrically connected through the second conductive bridge, and at least one first conductive bridge is arranged in a non-intersection area of the first electrode and in contact with a first body segment of the first electrode, and an orthographic projection of the at least one first conductive bridge on the base substrate falls within an orthographic projection of the first body segment of the first electrode on the base substrate, the at least one first conductive bridge is arranged in a same layer as the second conductive bridge, and the at least one first conductive bridge is arranged in a different layer from the first body segment of the first electrode.

9. The method of claim 8, wherein an orthographic projection of the plurality of first body segments of the one of the first electrodes on the base substrate at least partially overlaps an orthographic projection of the first conductive bridge electrically connecting the two adjacent first body segments of the one of the first electrodes on the base substrate, or an orthographic projection of the plurality of second body segments of the one of second electrodes on the base substrate at least partially overlaps an orthographic projection of the second conductive bridge electrically connecting the two adjacent second body segments of the one of the second electrodes on the base substrate.

10. The method of claim 8, wherein, the plurality of intersection areas comprise a first intersection area in which the first conductive bridge electrically connecting the two adjacent first body segments of the one of the first electrodes is located and a second intersection area in which the second conductive bridge electrically connecting the two adjacent second body segments of the one of the second electrodes is located, and the first intersection area and the second intersection area are arranged alternately.

11. The method of claim 8, wherein each first electrode further comprises a first intersection segment connected between the two adjacent first body segments of the one of the first electrodes and an additional first conductive bridge on the first intersection segment, and the additional first conductive bridge and the second conductive bridge electrically connecting the two adjacent second body segments of the one of the second electrodes are arranged in one intersection area of the plurality of intersection areas; or each second electrode further comprises a second intersection segment connected between the two adjacent second body segments of the one of the second electrodes and an additional second conductive bridge on the second intersection segment, and the additional second conductive bridge and the first conductive bridge electrically connecting the two adjacent first body segments of the one of the first electrodes are arranged in one intersection area of the plurality of intersection areas.

* * * * *